(12) United States Patent
Robadey et al.

(10) Patent No.: US 11,934,907 B2
(45) Date of Patent: Mar. 19, 2024

(54) CONNECTOR SYSTEM HAVING A CONNECTOR POSITION ASSURANCE MEMBER USING NEAR-FIELD AND FAR-FIELD ANTENNAS

(71) Applicant: ASSA ABLOY AB, Stockholm (SE)

(72) Inventors: Jean-Miguel Robadey, Bossonnens (CH); Christian Mirus, Fribourg (CH)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/760,045

(22) PCT Filed: Dec. 29, 2020

(86) PCT No.: PCT/EP2020/087989
§ 371 (c)(1),
(2) Date: Aug. 3, 2022

(87) PCT Pub. No.: WO2021/155995
PCT Pub. Date: Aug. 12, 2021

(65) Prior Publication Data
US 2023/0057097 A1 Feb. 23, 2023

(30) Foreign Application Priority Data
Feb. 4, 2020 (EP) .................................... 20155462

(51) Int. Cl.
*G06K 7/10* (2006.01)
*G06K 19/07* (2006.01)
*G06K 19/077* (2006.01)

(52) U.S. Cl.
CPC ..... *G06K 7/10297* (2013.01); *G06K 19/0723* (2013.01); *G06K 19/07737* (2013.01)

(58) Field of Classification Search
None
See application file for complete search history.

(56) References Cited

U.S. PATENT DOCUMENTS

| 2009/0156042 A1 | 6/2009 | Radenne et al. |
| 2013/0119144 A1 | 5/2013 | Suzuki |

(Continued)

FOREIGN PATENT DOCUMENTS

| CN | 115280603 | 11/2022 |
| EP | 2153496 A1 | 2/2010 |

(Continued)

OTHER PUBLICATIONS

"European Application Serial No. 20155462.3, Extended European Search Report dated Apr. 12, 2021", 16 pgs.

(Continued)

*Primary Examiner* — Suezu Ellis
(74) *Attorney, Agent, or Firm* — Schwegman Lundberg & Woessner, P.A.

(57) ABSTRACT

A method to check if a connector system with a Connector Position Assurance ("CPA") member is in a closed position. The method includes providing an RFID-tag reader that is positioned at a distance D to the integrated circuit enabling far-field RFID communication and not permitting near-field RFID communication. Further, the method includes checking the readability of the integrated circuit with the RFID-tag reader and issuing an alert signal if the integrated circuit is not readable by the RFID-tag reader indicating that the CPA member is not in the closed position.

10 Claims, 7 Drawing Sheets

(56) References Cited

U.S. PATENT DOCUMENTS

2015/0147901 A1 5/2015 Wu et al.
2021/0384677 A1* 12/2021 Pavlovic ............ H01R 13/6691

FOREIGN PATENT DOCUMENTS

| EP | 3866278 | 2/2023 |
|---|---|---|
| JP | H03280370 | 12/1991 |
| JP | H04196076 | 7/1992 |
| JP | 2006073394 | 3/2006 |
| JP | 2012195309 | 10/2012 |
| JP | 2023513142 | 3/2023 |
| WO | WO-2015143183 A1 | 9/2015 |
| WO | WO-2019147246 A1 | 8/2019 |
| WO | WO-2021155995 A1 | 8/2021 |

OTHER PUBLICATIONS

"European Application Serial No. 20155462.3, Extended European Search Report dated Jul. 14, 2021", 11 pgs.
"European Application Serial No. 20155462.3, Extended European Search Report dated Aug. 5, 2021", 11 pgs.
"European Application Serial No. 20155462.3, Extended European Search Report dated Oct. 26, 2020", 11 pgs.
"European Application Serial No. 20155462.3, Partial European Search Report dated Jan. 1, 2021", 17 pgs.
"European Application Serial No. 20155462.3, Response filed Feb. 8, 2022 to Extended European Search Report dated Apr. 12, 2021", 39 pgs.
"European Application Serial No. 22163776.2, Extended European Search Report dated May 31, 2022", 7 pgs.
"International Application Serial No. PCT/EP2020/087989, International Search Report dated May 11, 2021", 6 pgs.
"International Application Serial No. PCT/EP2020/087989, Invitation to Pay Additional Fees dated Mar. 16, 2021", 15 pgs.
"International Application Serial No. PCT/EP2020/087989, Written Opinion dated May 11, 2021", 12 pgs.
"Mexican Application Serial No. MX a 2022 009601, Office Action dated Aug. 10, 2022", With English machine translation, 8 pgs.
"Canadian Application Serial No. 3166769, Voluntary Amendment Filed Aug. 2, 2022", 8 pgs.
"Korean Application Serial No. 10-2022-7030522, Voluntary Amendment Filed Sep. 2, 2022", W English Claims, 47 pgs.
"Japanese Application Serial No. 2022-547282, Voluntary Amendment Filed Sep. 28, 2022", W English Claims, 18 pgs.
"European Application Serial No. 22163776.2, Response Filed Feb. 2, 2023 to Extended European Search Report dated May 31, 2022", 9 pgs.
"Japanese Application Serial No. 2022-547282, Notification of Reasons for Refusal dated Aug. 8, 2023", w English Translation, 10 pgs.
"Canadian Application Serial No. 3,166,769, Office Action dated Oct. 6, 2023", 5 pgs.
"Japanese Application Serial No. 2022-547282, Response Filed Nov. 8, 2023 to Notification of Reasons for Refusal dated Aug. 8, 2023", with English claims, 14 pages.
"European Application Serial No. 22163776.2, Communication Pursuant to Article 94(3) EPC dated Nov. 21, 2023", 3 pages.
"Japanese Application Serial No. 2022-547282, Decision of Rejection dated Dec. 5, 2023", with English translation, 9 pages.

* cited by examiner

SHORT Reading distance

LONG Reading distance

Closed position

Open position

CONNECTOR SYSTEM HAVING A CONNECTOR POSITION ASSURANCE MEMBER USING NEAR-FIELD AND FAR-FIELD ANTENNAS

CROSS-REFERENCE TO RELATED APPLICATION(S)

This application is a national stage application under 35 U.S.C. § 371 of PCT Patent Application Serial No. PCT/EP2020/087989, titled "Near Field with Far Field to Verify that Device is Connected or Secured," filed Dec. 29, 2020, which claims priority to European Patent Application Serial No. 20155462.3, titled "Near Field with Far Field to Verify that Device is Connected or Secured," filed Feb. 4, 2020, each of which is incorporated by reference herein in its entirety.

TECHNICAL FIELD

The present disclosure generally relates to the field of connectors and RFID communication and more particularly to the assurance of the proper positioning of mated connectors by using RFID communication.

BACKGROUND

Particularly in the automotive industry, there is a new standard called CPA for Connector Position Assurance. A CPA is a locking mechanism that in a closed position ensures that the connectors are properly mated and prevents the mated connectors from accidental un-mating. During the assembly process, it is necessary to check if the locking mechanism is in closed position. One known way to perform this check is to use a Data Matrix code laser engraved on the connector and hidden by the locking mechanism in open position and only visible once the locking mechanism is in closed position. Another option to check if the locking mechanism is in closed position is visual inspection by the operator. These checking processes require the visual accessibility either for the Data Matrix code scanner or the operator.

U.S. Pat. No. 7,854,623 B2 describes a connecting device having a connector and a counterpart connector suitable to mate therewith, and at least one RFID tag attached to one of said connectors and suitable to communicate with a reader, said RFID tag including an antenna. The device further includes a switch adapted to put the RFID tag either in a first communication state or in a second communication state, depending on the full or incomplete mating state of the connectors.

U.S. Pat. No. 9,711,903 B2 describes a connector system with a connector that includes an RFID circuit. Before the connector is mated with a corresponding connector the RFID circuit is tuned so that it does not function in a desired manner at a desired frequency. Once the connector is mated the tuning of the RFID circuit is modified so that the RFID circuit functions in the desired manner at the desired frequency.

U.S. Pat. No. 10,448,231 B2 describes methods and apparatuses using RFID devices to assist in determining an open status of a container. For example, a first RFID tag is fixed to a first portion of the container and a second RFID tag is fixed to a second portion of the container. Upon a user action to at least partially open the container, the first and second portions will move relative to each other, such that one or more of the RFID tags will no longer be readable by the RFID-tag reader or will now be readable by the reader. The reading or cessation of reading of one or more RFID tags indicates at least one open status of the container. In some embodiments, the open status is at least one of an unsealing confirmation, an open motion initiation status, an open motion confirmation, a partial open status and a fully open status.

EP 2 153 496 A1 discloses a connector assembly comprising a first connector, a second connector and a mating detection device. The first connector comprises a first locking feature. The second connector comprises a second locking feature cooperating with the first locking feature. The mating detection device is adapted to take a first electrical state when the first and second connectors are in a locked state. The mating detection device is mechanically prevented from taking the first state until the first and second locking features lock said first and second connectors together.

The present disclosure is directed, at least in part, to improving or overcoming one or more aspects of prior systems.

SUMMARY OF THE DISCLOSURE

According to one aspect, the present disclosure relates to a method to check if a connector system is provided with a Connector Position Assurance member (as used herein "a CPA member") in closed position. The method may comprise the step of providing a first connector and a second connector configured to be mated with the first connector, wherein the first connector or the second connector is provided with a far-field antenna. Further the method may comprise the step of providing a CPA member which includes an integrated circuit and a near-field antenna which is electrically connected to the integrated circuit. The CPA member might be configured to have an open position and a closed position wherein in the closed position the CPA member may confirm a proper connection of the first connector and the second connector and may prevent the first connector and the second connector from accidental un-mating. Further the method may comprise the step of mating of the first connector and the second connector and the step of moving the connection position assurance member to the closed position, wherein in the closed position the near-field antenna is inductively coupled with the far-field antenna such that communication with the integrated circuit of the CPA member is now possible in the far-field of RFID communication. Further the method may comprise the step of providing an RFID-tag reader wherein the RFTD-tag reader is positioned to the integrated circuit at such a distance D that enables far-field RFID communication and does not permit near-field RFID communication between the RFID-tag reader and the integrated circuit. Further the method may comprise the step of checking the readability of the integrated circuit with the RFID-tag reader.

According to another aspect, the present disclosure relates to a connector system for the assurance of properly connected and secured connectors. The connector system may comprise a first connector and a second connector configured to be mated with the first connector, wherein the first connector or the second connector is provided with a far-field antenna. Further the connector system may comprise a CPA member which includes an integrated circuit and a near-field antenna which is electrically connected to the integrated circuit wherein the CPA member may be configured to have an open position and a closed position wherein in the closed position the CPA member may confirm proper connection of the first connector and the second connector and may prevent the first connector and the second connector from accidental un-mating. In the closed position the near-field antenna may be inductively coupled with the far-field antenna such that communication with the integrated circuit 10 of the CPA member 9 is now possible in the far-field of RFID communication.

According to another aspect, the present disclosure relates to an RFID tag. The RFID tag may comprise a first component provided with an integrated circuit and a near-field antenna being electrically connected to the integrated circuit, a second component provided with a far-field antenna and a pivoting mechanism configured to allow pivoting of the first component and the second component from an open position, in which the first and second component are separated to a closed position, in which the near-field antenna is inductively coupled with the far-field antenna and the integrated circuit becomes readable not only in the near field of RFID communication but also in the far field of RFID communication.

Other features and aspects of this disclosure will be apparent from the following description and the accompanying drawings.

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

Figure 1:
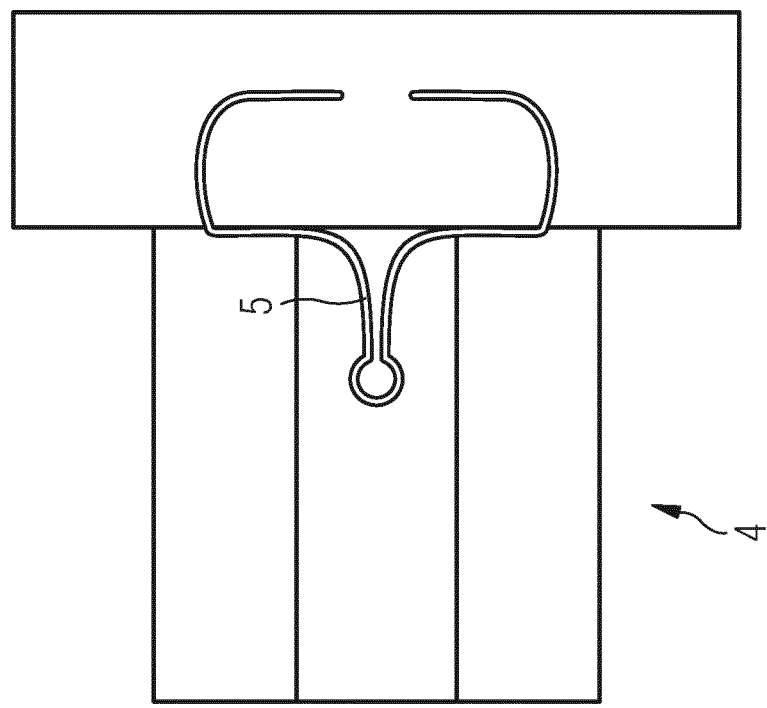
FIG. 1 illustrates a first embodiment for a connector system according to the present disclosure with the first connector and second connector not mated.
Figure 1:
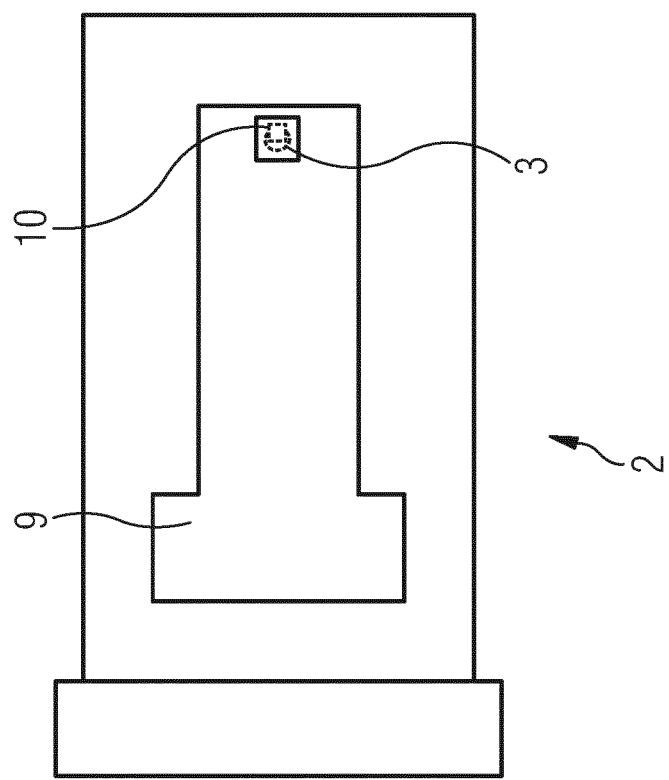

FIG. 1 illustrates a first embodiment for a connector system according to the present disclosure. The connector system comprises a first connector 2, a second connector 4 and a CPA member 9. The second connector 4 is configured to be mated with the first connector 2. The second connector 4 is provided with a far-field antenna 5. The CPA member 9 includes a near-field antenna 3 and an integrated circuit 10. The near-field antenna 3 is electrically connected to the integrated circuit 10, for example, in FIG. 1, a chip with COB (coil on board). FIG. 1 shows the first connector 2 and the second connector 4 un-mated and the CPA member 9 in open position.

Figure 2:
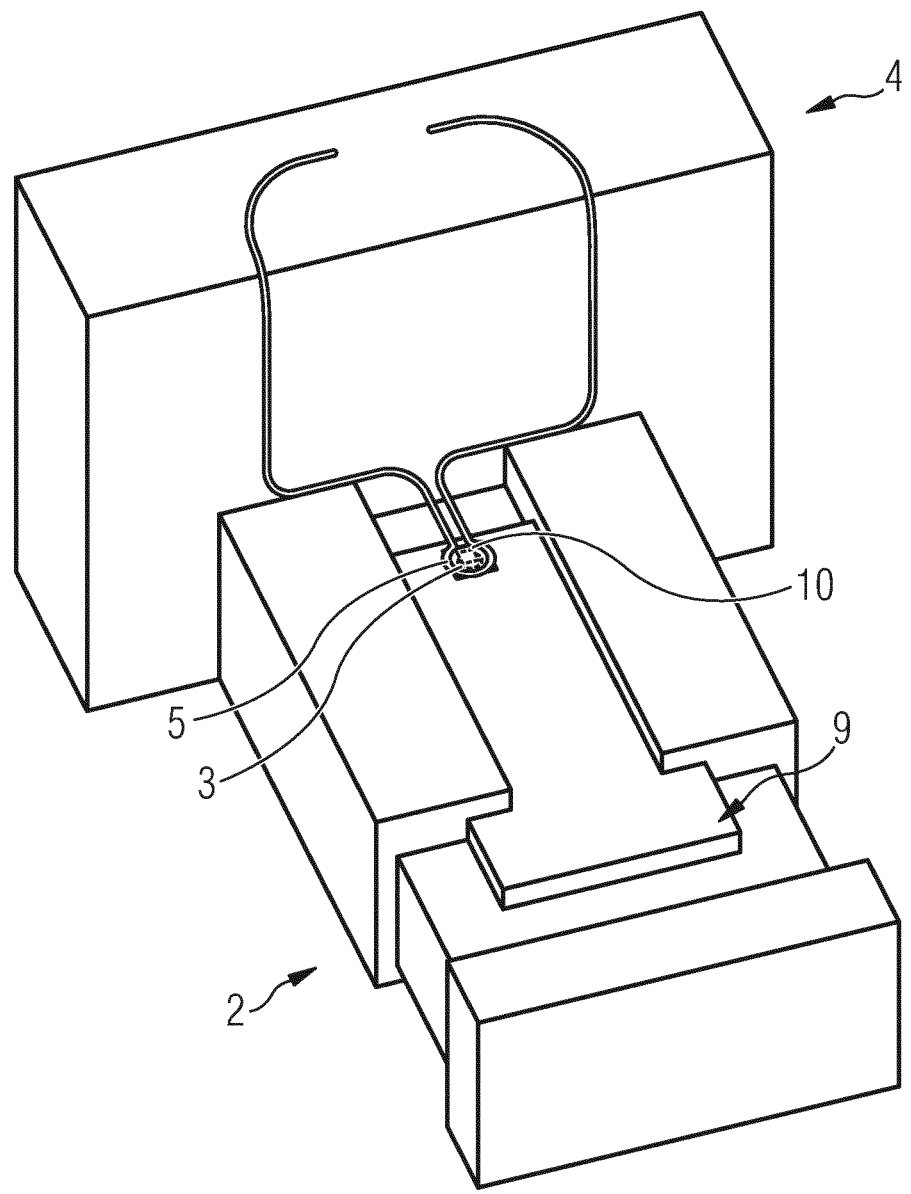
FIG. 2 illustrates the connector system as depicted in FIG. 1 with mated first and second connector and the CPA member in closed position.

FIG. 2 illustrates the system as depicted in FIG. 1 with the first connector 2 fully inserted in the second connector 4 and the CPA member 9 in closed position. The near-field antenna 3 is located within a loop of the far-field antenna 5. Therefore, the integrated circuit 10 now is readable not only in the near field RFID communication but also in the far field of RFID communication.

Figure 3:
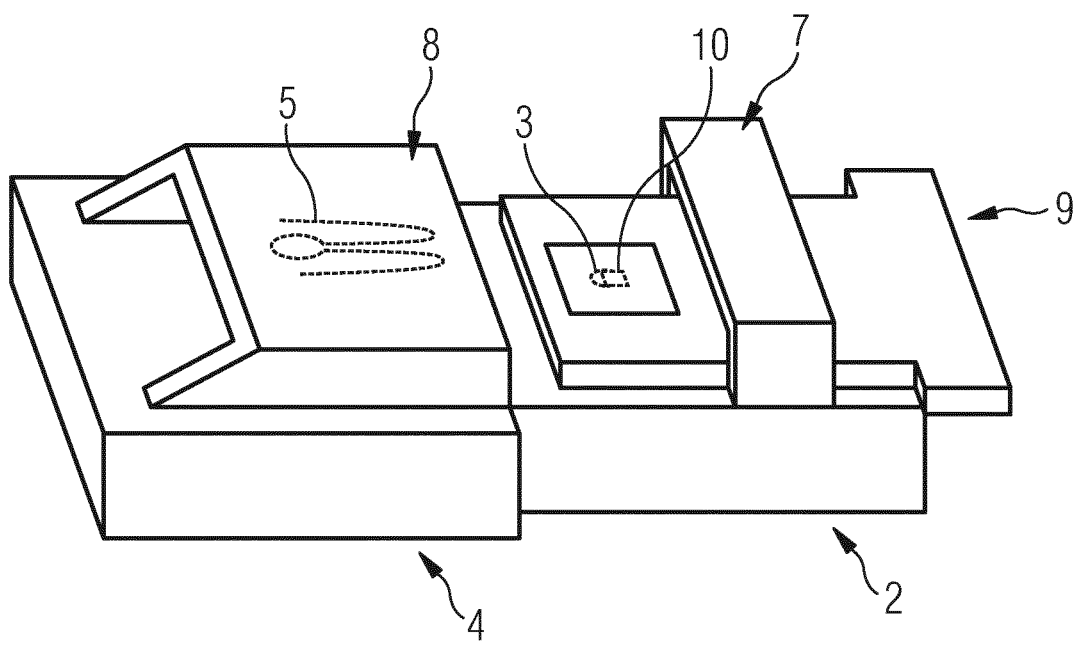
FIG. 3 illustrates a second embodiment for a connector system according to the present disclosure with the first connector partly inserted in the second connector and the CPA element in preassembled position.

FIG. 3 illustrates a second embodiment for a connector system according to the present disclosure. The connector system comprises a first connector 2, a second connector 4 and a CPA member 9. The second connector 4 is configured to be mated with the first connector 2. The second connector 4 is provided with a far-field antenna 5 (chip with COB), both schematically shown in FIG. 3. The CPA member 9 includes an integrated circuit 10 and a near-field antenna 3 (schematically shown). The near-field antenna 3 is electrically connected to the integrated circuit 10. Receiving means 7 are formed on the first connector 2 and receiving means 8 are formed on the second connector 4 for receiving the CPA member 9. In the embodiment of FIG. 3, the receiving means 7 are an integral part of the first connector 2 and the receiving means 8 are an integral part of the second connector 4. The CPA member 9 is movably connected to the receiving means 7 on the first connector 2. The CPA member 9 can be moved from a preassembled position to a closed position. FIG. 3 shows the first connector 2 partly inserted in the second connector 4 and the CPA member 9 in preassembled position. The near-field antenna 3 is not coupled with the far-field antenna 5 of the second connector 4.

Figure 4:
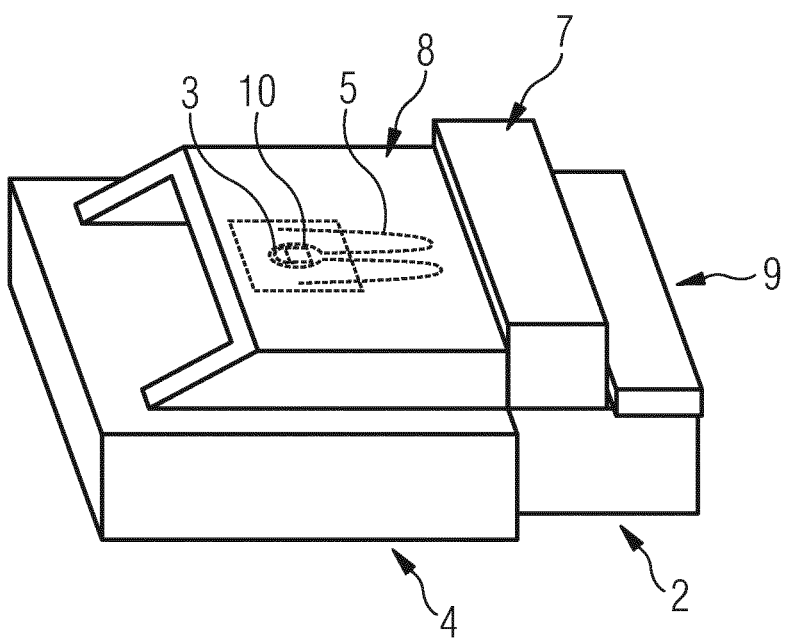
FIG. 4 illustrates the system as depicted in FIG. 3 with the first connector fully inserted in the second connector and the CPA member in closed position.

FIG. 4 illustrates the system as depicted in FIG. 3 with the first connector 2 fully inserted in the second connector 4 and the CPA member 9 in closed position. The near-field antenna 3 is coupled with the far-field antenna 5 (shown schematically) of the second connector 4. Therefore, the integrated circuit 10 is now readable not only in the near-field of RFID communication but also in the far-field of RFID communication.

Figure 5:
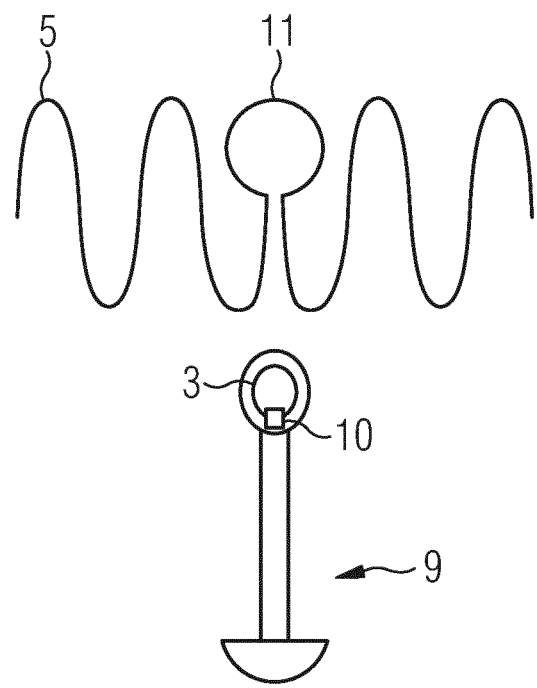
FIG. 5 illustrates the principle of coupling a near-field antenna with a far-field antenna to change the reading distance for an integrated circuit.
Figure 5:
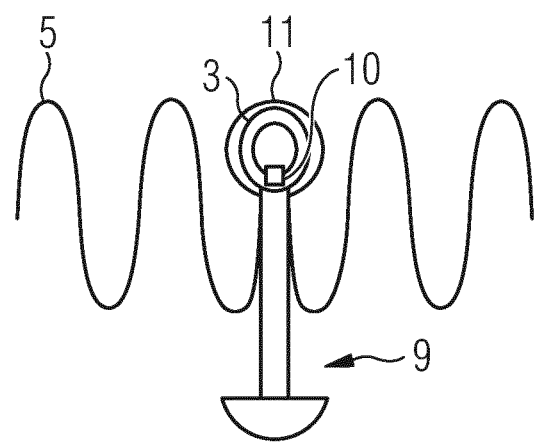

FIG. 5 illustrates the principle of coupling a near-field antenna 3 with a far-field antenna 5. The near-field antenna 3 is electrically connected to an integrated circuit 10. The near-field antenna 3 and the integrated circuit 10 are provided on a CPA member 9. If the near-field antenna 3 is not positioned within the coupling loop 11 of the far-field antenna 5, the integrated circuit is readable in a short distance i.e. the near-field of RFID communication. If however, the near field antenna 3 is positioned within the coupling loop 11 of the far-field antenna 5, the integrated circuit is readable in a long distance, i.e. the far-field of RFID communication.

Figure 6:
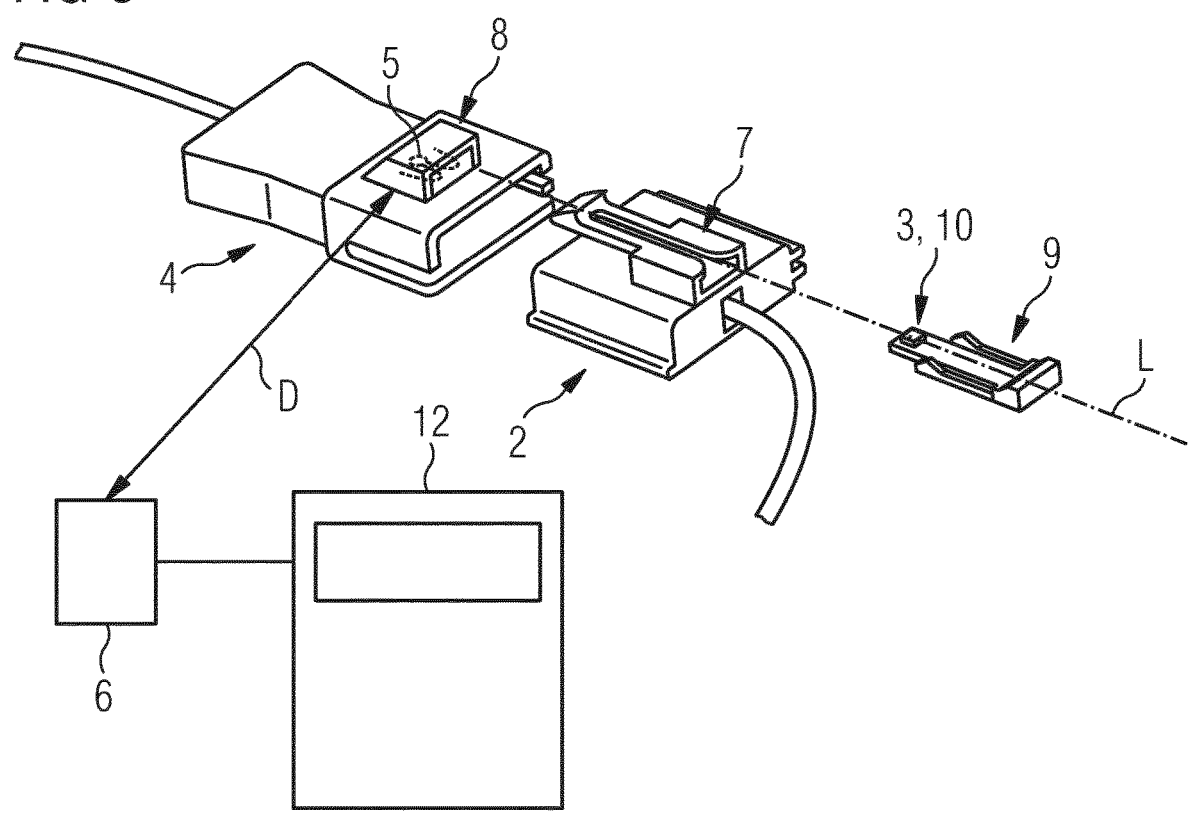
FIG. 6 illustrates a system for which the method to check if a connector system is provided with a CPA member in closed position according to the present disclosure can be applied.

FIG. 6 illustrates a system for which the method to check if a connector system is provided with a CPA member 9 in closed position according to the present disclosure can be applied. The system comprises a first connector 2 and a second connector 4. The first connector 2 and second connector 4 are configured to be mated with each other. The second connector 4 is provided with a far-field antenna 5 (schematically shown). One step of the method according to the present disclosure may be the mating of the first connector 2 and the second connector 4 along the dotted line L. The system shown in FIG. 6 further comprises a CPA member 9 which is provided with an integrated circuit 10 and an electrically connected near-field antenna 3, i.e. a chip with COB (coil on board). A further step of the method according to the present disclosure may be the moving of the CPA member 9 to its closed position by inserting it into the receiving means 7 on the first connector 2 and into the receiving means 8 on the second connector 4 along the dotted line L. In the closed position, the integrated circuit 10 with the near-field antenna 3 is inductively coupled with the far-field antenna 5 and is now readable not only in the near-field of RFID communication but also in the far-field of RFID communication. Further in the closed position, the CPA member 9 prevents the mated connectors from accidental un-mating. If the CPA member 9 cannot be inserted into the assembled connectors 2, 4, it is an indication that the connectors 2, 4 are not properly engaged. As used herein, the term "properly mated" is intended to mean that the connectors have been sufficiently mated to achieve their intended purpose, e.g. electrical connectors enable a current flow when properly connected. The system further comprises an RFID-tag reader 6 and an output unit 12. The RFID-tag reader 6 is positioned to the integrated circuit 10 at such a distance D that enables far-field RFID communication and does not permit near-field RFID communication between the RFID-tag reader and the integrated circuit 10. A further step of the method according to the present disclosure may be the checking of the readability of the integrated circuit 10 with the RFID-tag reader 6. If the integrated circuit 10 is readable by the RFID-tag reader, the near-field antenna is coupled with the far-field antenna, i.e. the first connector 2 and second connector 4 are properly mated and secured against accidental un-mating. The present disclosure may comprise as a further step the issuing of a signal at the output unit 12. The signal may be a red light or some other method of alerting an operator that integrated circuit 10 is not readable with the RFID-tag reader. If the integrated circuit 10 is readable with the RFID-tag reader 6, the signal may be a green light or the like to inform the operator.

Figure 7:
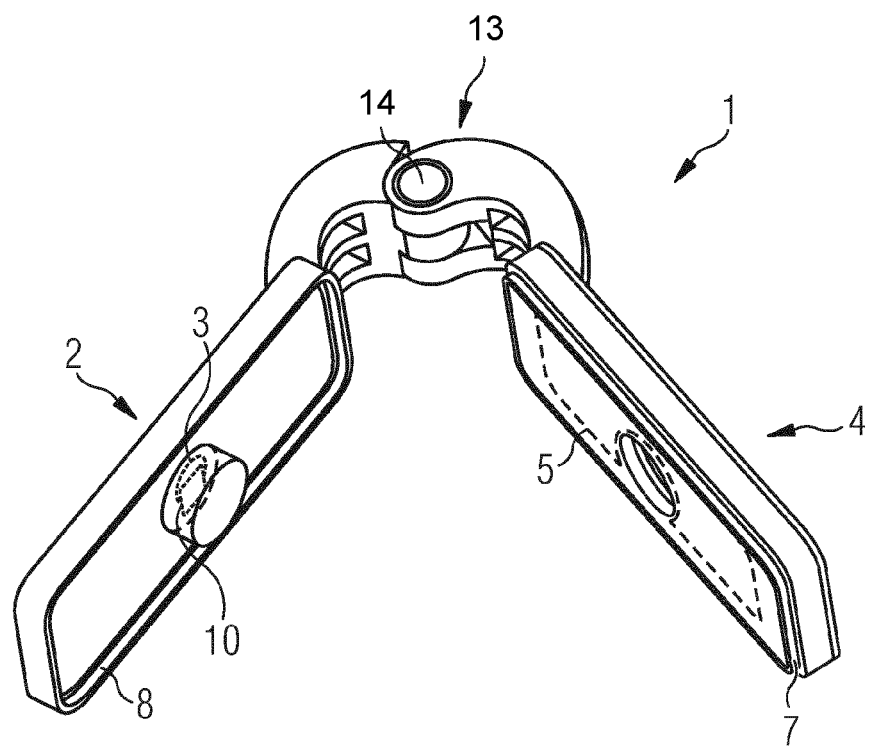
FIG. 7 illustrates an embodiment of an RFID tag according to the present disclosure.

FIG. 7 illustrates an embodiment of an RFID tag according to the present disclosure. FIG. 7 shows a first component 2 and a second component 4 of the RFID tag. The first component 2 and the second component 4 are each at one end connected to a pivoting mechanism 13 which permits pivoting of the first component 2 and the second component 4. The pivoting mechanism 13 comprises a pin 14 which connects the first component 2 and the second component 4 and which is the rotational axis for the pivoting movement of the first and the second components 2, 4. The first component 2 comprises an integrated circuit 10 which is electrically connected to a near-field antenna 3. The second component 4 comprises a far-field antenna 5. If the first component 2 and the second component 4 are in a closed position, i.e. the first and second components 2, 4 are side by side, the near-field antenna 3 and the far-field antenna 5 are coupled. When near-field antenna 3 and the far-field antenna 5 are coupled, the integrated circuit with near-field antenna 3 is not only readable in the near field of RFID communication but also in the far-field RFID communication.

Figure 8:
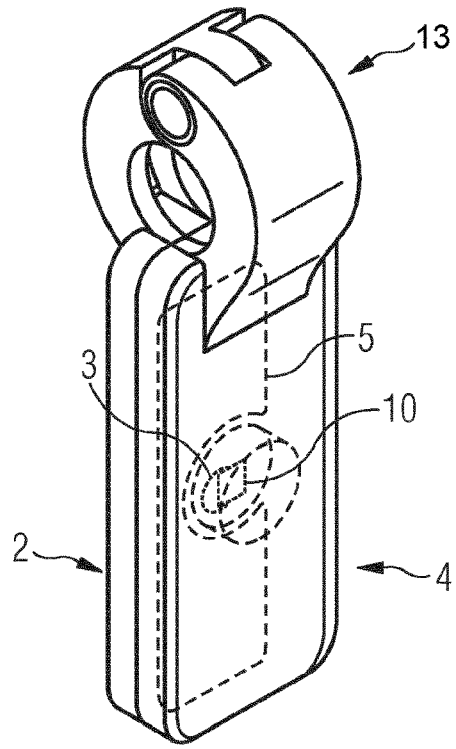
FIG. 8 illustrates the embodiment of an RFID tag depicted in FIG. 7 in a closed and in an open position.
Figure 8:
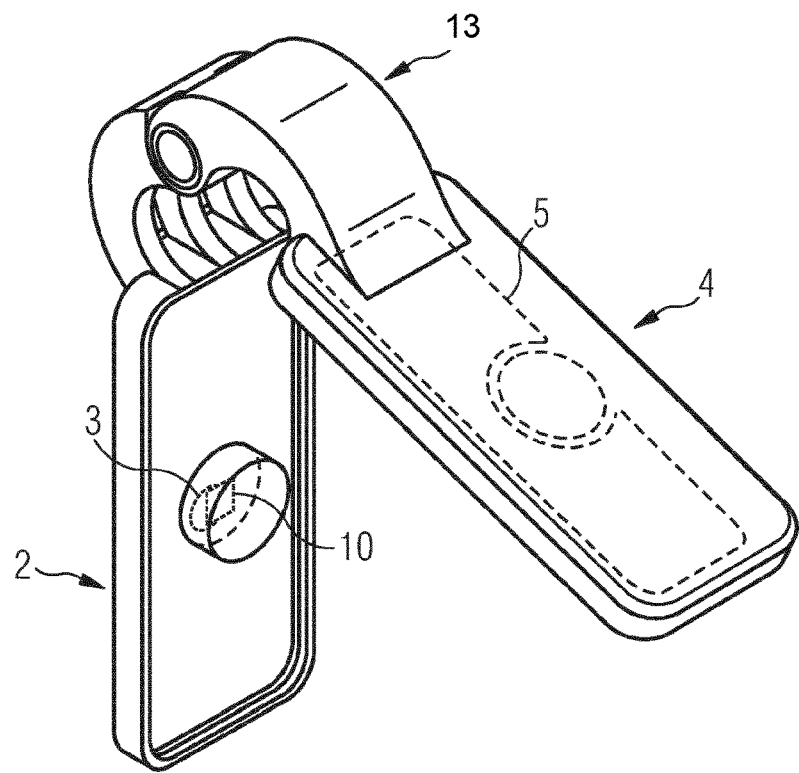

FIG. 8 illustrates the embodiment depicted in FIG. 7 in a closed and in an open position. In the closed position the first and second components 2, 4 are side by side and the integrated circuit with near-field antenna 3 and the far-field antenna 5 are coupled. In the open position the first and second components 2, 4 are separated and the integrated circuit with near-field antenna 3 is not coupled with the far-field antenna 5.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of this disclosure have been described herein, improvements and modifications may be incorporated without departing from the scope of the following claims.

INDUSTRIAL APPLICABILITY

The present disclosure is based at least in part on the realization that there is a need for a reliable solution to check if a connector system is provided with a CPA member in closed position. In this respect, it has been realized that it is advantageous if the requirement of visual view on the connectors for this checking process can be avoided. The idea is to use a near-field antenna which is electrically connected to an integrated circuit on the CPA member and a far-field antenna as a booster on the connector itself. For the near-field antenna with integrated circuit one may use a UHF PCB coin, a UHF coil-on-chip or coil-on-a-chip or on-chip-coil or anything comparable. Once the connector is plugged, one needs to put the CPA member in closed position to couple the near-field antenna with the far-field antenna and by this to increase the read range of the RFID system. If the CPA member is not in closed position (not locked), the reading distance will be reduced to the near-field antenna reading distance with very limited reading range. This principle could also be used to be sure that a plug (containing near-field antenna) is connected with an outlet (containing far-field antenna). Another use case is for tamper evidence tags. For example if you try to remove the tag from the object, the near-field antenna will be disconnected from the far-field antenna and the tag loses its reading range. One advantage of the disclosure is that there is no need of visual view of the connector to be sure it is locked.

According to a preferred embodiment of the disclosure, the connector system may allow a moving of the CPA member to the closed position only if the first connector and the second connector are properly mated. Further embodiments may be provided with receiving means on the first connector and on the second connector for receiving the CPA member. The receiving means might be an integral part of the first connector and of the second connector. The connector system might be configured such that the deliberate removal of the CPA member and un-mating of the first connector and the second connector can be easily performed without destroying the CPA member, the first connector or the second connector. In exemplary embodiments the near-field antenna may be a UHF antenna with a read range of several millimeters and the far-field antenna may be a UHF antenna with a read range of several meters.

With regard to the RFID tag of the disclosure, a preferred embodiment of the RFID tag may be provided with a locking mechanism including a first locking part located on one of the first and second components and a second locking part located on the other of the first and second components. The locking mechanism preferably is configured to have an open position and a closed position wherein in the closed position the first locking part is pressed into the second locking part and prevents the first and second components from separating. The first and second locking parts may be integral parts of the first component and of the second component, respectively, and the locking parts may be surrounding the first and second components, respectively. In exemplary embodiments the locking mechanism may be configured such that it can be put in open status after it has been closed without destroying the RFID tag. The pivoting mechanism may be realized with a pin which connects the first component and the second component and which is the rotational axis for the pivoting movement of the first and the second components. In exemplary embodiments the near-field antenna may be a UHF antenna with a read range of several millimeters and the far-field antenna may be a UHF antenna with a read range of several meters.

With regard to the method of the present disclosure, the method preferably may comprise the step of issuing an alert signal if the integrated circuit is not readable with the RFID-tag reader. Such an alert signal indicates that the connector position assurance is not in the closed position.

The invention claimed is:

1. A method to check if a connector system is provided with a Connector Position Assurance (CPA) member in a closed position, the method comprising:
   providing a first connector and a second connector configured to be mated with the first connector, wherein the first connector or the second connector is provided with a far-field antenna;
   providing a CPA member including an integrated circuit and a near-field antenna electrically connected to the integrated circuit, the CPA member being configured to have an open position and a closed position, wherein in the closed position the CPA member confirms a proper connection of the first connector and the second connector and prevents the first connector and the second connector from accidental un-mating;
   mating of the first connector and the second connector;
   moving the CPA member to the closed position, wherein in the closed position of the CPA member the near-field antenna is inductively coupled with the far-field antenna such that far-field Radio Frequency Identification (RFID) communication with the integrated circuit of the CPA member is possible;
   providing an RFID-tag reader wherein the RFID-tag reader is positioned to the integrated circuit at such a distance that enables far-field RFID communication and does not permit near-field RFID communication between the RFID-tag reader and the integrated circuit; and
   checking a readability of the integrated circuit with the RFID-tag reader.

2. The method of claim 1 further comprising issuing an alert signal if the integrated circuit is not readable with the RFID-tag reader indicating that the CPA member is not in the closed position.

3. The method of claim 1 wherein moving the CPA member to the closed position is only possible if the first connector and the second connector are properly mated.

4. A connector system for the assurance of properly mated and secured connectors comprising:
   a first connector and a second connector configured to be mated with the first connector, wherein the first connector or the second connector is provided with a far-field antenna; and
   a Connector Position Assurance (CPA) member including an integrated circuit and a near-field antenna electrically connected to the integrated circuit, the CPA member being configured to have an open position and a closed position, wherein in the closed position the CPA member confirms a proper connection of the first connector and the second connector and prevents the first connector and the second connector from accidental un-mating;
   wherein in the closed position of the CPA member the near-field antenna is inductively coupled with the far-field antenna such that far-field Radio Frequency Identification (RFID) communication with the integrated circuit of the CPA member is possible.

5. The connector system of claim 4 wherein the first connector, the second connector and the CPA member are configured to allow a moving of the CPA member to the closed position only if the first connector and the second connector are properly mated.

6. The connector system of claim 4 wherein the first connector is provided with a receiving means for receiving the CPA member and the second connector is provided with a receiving means for receiving the CPA member.

7. The connector system of claim 6 wherein the CPA member is movably connected to the receiving means of the first connector or the receiving means of the second connector and the CPA member can be moved from a preassembled position to the closed position.

8. The connector system of claim 4 wherein the near-field antenna and the far-field antenna have different read ranges.

9. The connector system of claim 8 wherein the near-field antenna is an Ultra High Frequency (UHF) antenna with a read range of several millimeters and the far-field antenna is a UHF antenna with a read range of several meters.

10. The connector system of claim 4 wherein the connector system is configured such that a deliberate removal of the CPA member and un-mating of the first connector and the second connector can be performed without destroying the CPA member, the first connector or the second connector.

* * * * *